(12) United States Patent
Kechriotis

(10) Patent No.: US 6,247,261 B1
(45) Date of Patent: Jun. 19, 2001

(54) FISHING LURE HAVING HOOK CLIP

(76) Inventor: George Kechriotis, 420 Buttonwood Plz., Boca Raton, FL (US) 33431

( * ) Notice: Subject to any disclaimer, the term of this patent is extended or adjusted under 35 U.S.C. 154(b) by 0 days.

(21) Appl. No.: 09/479,149

(22) Filed: Jan. 7, 2000

Related U.S. Application Data

(63) Continuation of application No. 09/198,885, filed on Nov. 23, 1998, now Pat. No. 6,012,248, which is a continuation-in-part of application No. 08/857,452, filed on May 16, 1997, now abandoned.
(60) Provisional application No. 60/018,345, filed on May 17, 1996.

(51) Int. Cl.$^7$ ..................................................... A01K 83/00
(52) U.S. Cl. .............................................................. 43/42.53
(58) Field of Search ............................... 43/42.32, 42.33, 43/42.34, 42.53

(56) References Cited

U.S. PATENT DOCUMENTS

| 323,111 | * | 7/1885 | Chapman . |
| 1,273,425 | * | 7/1918 | Tuttle . |
| 1,422,841 | * | 7/1922 | Dey . |
| 1,670,174 | * | 5/1928 | Wiersma . |
| 1,777,004 | * | 9/1930 | Lemere et al. . |
| 1,993,798 | * | 3/1935 | Peterson . |
| 2,181,254 | * | 11/1939 | Wilson . |
| 2,225,676 | * | 12/1940 | White . |

* cited by examiner

Primary Examiner—Thomas Price
(74) Attorney, Agent, or Firm—Malin, Haley & DiMaggio, P.A.

(57) ABSTRACT

A fishing lure is disclosed which is molded from the cast of a natural baitfish in a method which has increased the thickness in dimension of the original fins and tail section for the purpose of increasing the fishing lures durability and ease of manufacture.

12 Claims, 7 Drawing Sheets

FISHING LURE HAVING HOOK CLIP

This continuation application claims priority to and the benefit of U.S. application Ser. No. 09/198,885, filed Nov. 23, 1998, now U.S. Pat. No. 6,012,248 which claims priority to and the benefit of continuation-in-part application of U.S. application Ser. No. 08/857,452, filed May 16, 1997, now abandoned which claims priority to and the benefit of Provisional Application No. 60/018,345 filed May 17, 1996.

BACKGROUND OF THE INVENTION

1. Field of the Invention

This invention relates generally to fishing lures, in particular to a fishing lure made of a cast of a natural bait which overcomes the limitations of the prior art and/or having a hook clip.

2. Description of the Prior Art

In the past previous attempts have been made to provide a fishing lure which has been molded from an actual fish specimen. U.S. Pat. No. 4,108,955 ('955 Patent) issued to Thom, describes a process in which the necessary attachments have been incorporated for attaching the hooks and fishing line.

The fishing lure created resulting from utilizing this process, however, had disadvantages in actual practice and manufacture in that the fins and tail section of the fishing lure were too thin to be manufactured effectively by common manufacturing methods and most available materials without being too fragile or impractical in actual use.

Subsequently, the same inventor (Thom) later applied and received U.S. Pat. No. 4,238,444 ('444 Patent) in which the casting process was modified to overcome this disadvantage in order to make the fishing lure more durable and easier to manufacture.

The modification of the process described in the '444 Patent involves removing the fins and tail section from the original baitfish and replacing such with fins and a tail section that have been sculpted from clay or other modeling material to have the appearance and profile dimension of the natural baitfish; but being thicker in dimension so as to overcome the problems associated with the original casting process.

However, the lure described therein, while overcoming the problems associated with casting the razor thin fins and tail section of the natural baitfish described in the '955 Patent, has an inherent disadvantage in that the replacement fins and tail section which have been sculpted or modeled and then reattached to the fishing lure can never fully reproduce the original detail found in nature, as well as increasing the complexity of the process and time involved for casting the natural bait fishing lure.

The present invention provides an improved artificial fishing lure which overcomes these shortcomings. It is therefore to the effective resolution of the above shortcomings that the present invention is directed.

SUMMARY OF THE INVENTION

It is the object of the present invention to provide an improved process for casting a natural baitfish to be used in the manufacture of fishing lures which retains all of the detail of the original baitfish while providing a thickness in the fins and tail section so as to be durable and effective in use.

The present invention utilizes a multi-step casting process to achieve this result retaining all of the natural detail of the natural baitfish while adding dimension to the fins and tail. The present invention also offers another improvement over traditional fishing lures, in that the eyelets, rings, or other attachments to the lure body necessary for affixing the hooks and eyelets for the fishing line, are internally "wired through" or connected and inserted as a one-piece insert into the mold, and by giving consideration to the materials used for the eyelets, rings, or other attachments in respect to their ranking in the Galvanic series.

The Galvanic series is a system of ranking metals and other electrically conductive materials by their electrochemical potential to participate in galvanic reactions. A galvanic reaction occurs when two or more different metals are joined together or are in contact with each other in the presence of an electrolyte. Saltwater is a natural electrolyte. This is the reaction that takes place in an electric battery. As the galvanic reaction takes place, there is a flow of electrons between the two metals. The one metal gives up electrons to the other metal and undergoes corrosion while the other accepts the electrons and is protected against corrosion. This practice is commonly used by boat manufacturers where a zinc or magnesium plate is affixed to the hull of the boat to prevent corrosion of the metal parts of the boat that are exposed to the elements. This process is termed galvanic corrosion.

The metal that gives up the electrons and is corroded is called the anode and the metal that accepts the electrons and is protected from corrosion is termed the cathode. The "Galvanic Series" is a listing by what is called the nobility of metals. The nobility of a metal is its relative ranking or position, that is, whether a certain metal will act as the cathode or the anode when paired with another metal in the Galvanic Series. If care is taken in choosing the metals used for the attachments (i.e., eyelets, hooks, rings) to the lure, it is possible to create a galvanic reaction when the lure is placed in the water (especially saltwater). That is to say that the lure itself will exhibit an anodic and a cathodic end and there will be a flow of electrons or current generated between the ends of the fishing lure. The lure will behave as a battery electrically charging the water (acting as the electrolyte) immediately surrounding the fishing lure. Electrons are passing from the anodic metal being corroded to the cathodic metal being protected internally within the lure while at the same time an electromagnetic field is being generated as the electrons pass through the electrolyte, that is, the water, surrounding the fishing lure.

The advantages in this practice of fashioning or manufacturing a fishing lure in such a manner are twofold. The first advantage is that it would be possible by choosing the metals used for the attachments to the lure or for internally wiring through the lure, where the metals used would preferably be more anodic or less noble than the metals used in the manufacture of the fishing hooks. This would then protect the hooks (behaving as cathodes) from corrosion, i.e., rust and dulling hook points. A second advantage that is created by fashioning a lure to create a galvanic reaction (electrolysis) is that many species of fish are receptive to electromagnetic waves generated in the water. This is possible by nerve cells and organs fish possess known as electro-receptors. Different species of fish use this "sixth sense," in different ways. Sharks and rays can sense the electric fields produced by hidden fish and will strike or attack an electrode placed in the water with an equivalent electrical output. Members of the salmon family use their receptors to orient themselves to the earth's electromagnetic field that guide their migration patterns. Many other species use electricity to orient themselves and communicate as well as locate prey. Catfish, sturgeon, paddlefish, and lampreys, among other species, possess an entirely separate lobe of the brain dedicated to sensing electricity.

Research has shown that a slightly positive charge between 0.5 and 1.0 volts attract fish while a negative charge repels them. If the lure used were one that is undergoing a galvanic reaction calculated to imitate, that is to generate an electrical field of the same voltage as a baitfish or prey of the targeted gamefish, it would follow that the lure would be more attractive to the targeted species. The larger fish are more receptive to electromagnetic fields since their longer length creates a larger potential difference across their bodies. Studies have shown that a voltage of 0.5V produces a strong response to the electrical stimulus.

Accordingly, it is an object of the present invention to provide a fishing lure comprising a body which has been cast in a method which has resulted in a widening of the fins and tail section of the baitfish while leaving the head and body sections of the fish in more or less their original dimensions.

It is another object of the invention to provide a fishing lure exhibiting a design which would create a galvanic reaction in the water (electrolysis).

It is yet another object of the present invention to protect the exposed metal attachments, hooks, and rings of a fishing lure from the effects of galvanic corrosion, that is oxidation or rust.

It is still another object of the present invention to create an electromagnetic field surrounding the lure that may be attractive to certain species of gamefish.

It is even still another object of the present invention to provide a fishing lure having a hook clip.

In accordance with these and other objects which will become apparent hereinafter, the instant invention will now be described with particular reference to the accompanying drawings.

DESCRIPTION OF THE PREFERRED EMBODIMENT

The various steps involved in the preferred method of the present invention are illustrated in FIGS. 1 through 6.

Figure 1:
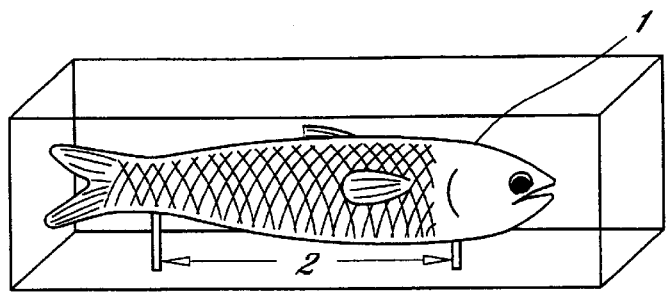
FIG. 1 shows a perspective of an actual bait fish suspended in an empty form.
Figure 2:
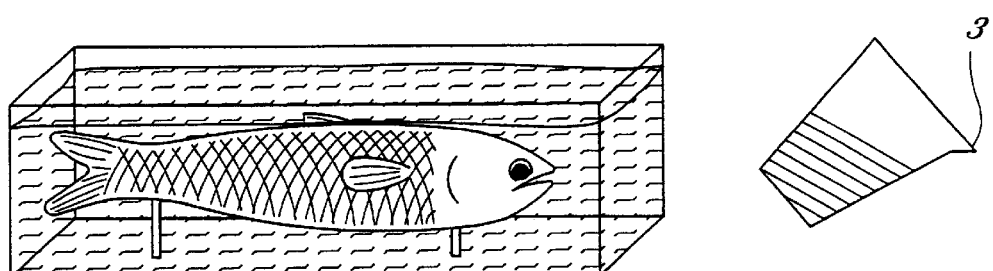
FIG. 2 shows a perspective of suspended bait fish as molding gel is being added to the form.

FIG. 1 shows the baitfish prepared by mounting the natural bait 1 on a pin 2 or rod in a partially enclosed form. FIG. 2 illustrates a flexible molding compound 3 such as silicone or latex rubber being poured over the model or natural bait 1 in its entirety, completely covering model 1. Additionally, a non-flexible molding material such as plaster or wax, or other conventional materials, could also be used at this point and are considered within the scope of the invention. The mold of the baitfish could also be produced by a duplicating router type machine or by computer imaging such as C.A.D. For sake of simplicity, "natural bait" will be defined hereinafter, including the claims, to mean a natural baitfish or other natural bait, a mold of a natural baitfish or other molded bait, or a model of a natural baitfish or model of another type of bait, all are considered within the scope of the invention.

Figure 3:
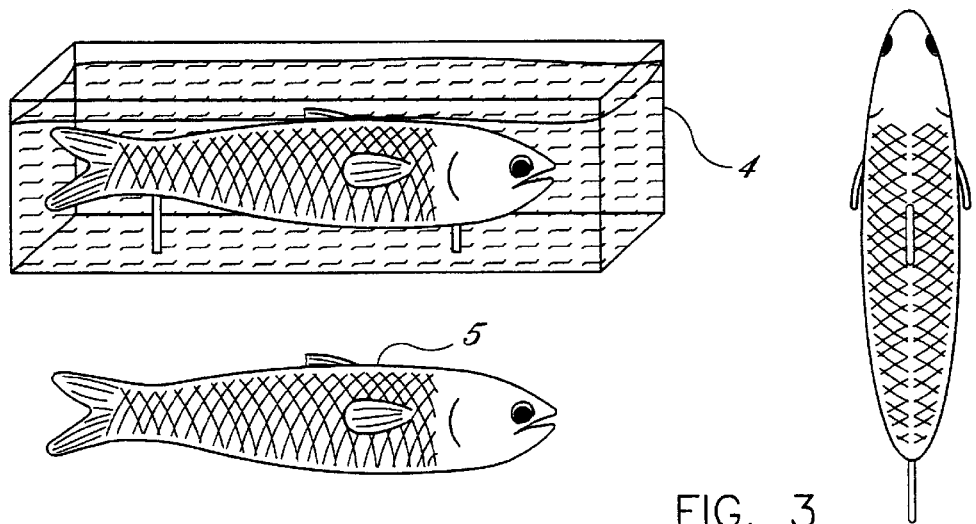
FIG. 3 shows the form with hardened casting gel as it would be cut down the middle.

As seen in FIG. 3, after the molding compound has set or hardened, the mold 4 is then bisected down the x-axis and the natural bait is removed. Alternatively, in the case of a duplicated model or C.A.D., the mold or model 5 would also be bisected or modeled in two opposite halves to achieve this same end.

Figure 4:
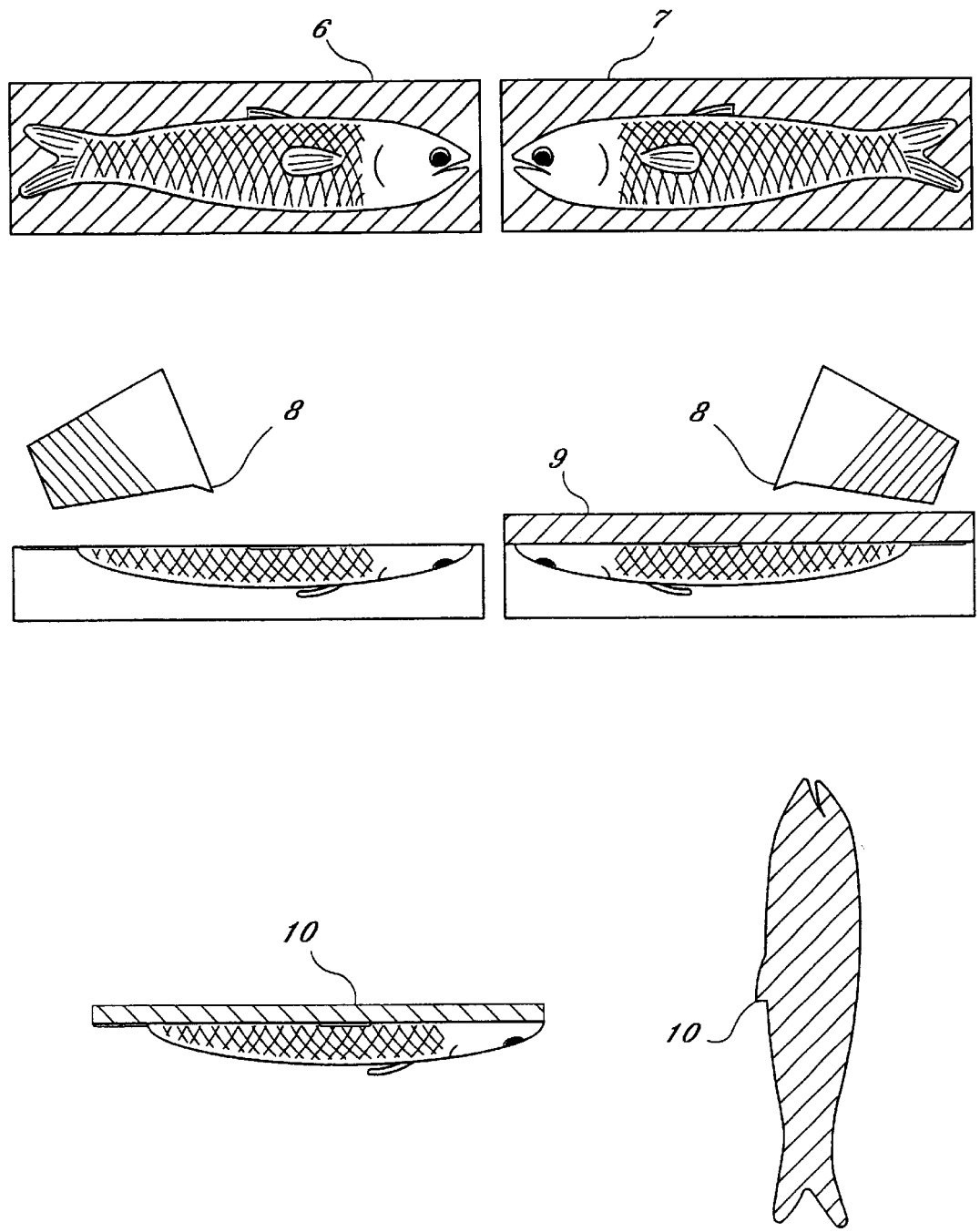
FIG. 4 shows the form as cut open with actual bait fish removed from casted form.

FIG. 4 shows a cast which is then made of both right 7 and left hand 6 portions of the bisected mold by pouring a castable material such as plaster or resin, or other conventional material(s) into both half molds. At this point it is important to note that excess casting 9 material is used to overfill the mold halves as to extend the z-axis beyond the top of the original form or alternatively the excess extension of the z-axis profile 10 of the mold or model could be programmed into the C.A.D. or equivalent computer design duplicator.

Figure 5:
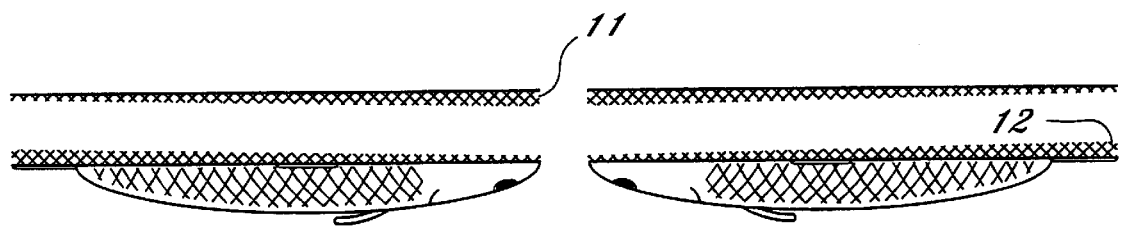
FIG. 5 shows methods of casting lure bait's fins onto the lure.

FIG. 5 shows the excess material is removed from areas where it is not desired 11 namely, at the head and torso of the model.

Excess material 12 is left in areas where it is desired, namely the fins and tail section of the mold or model.

Figure 6:
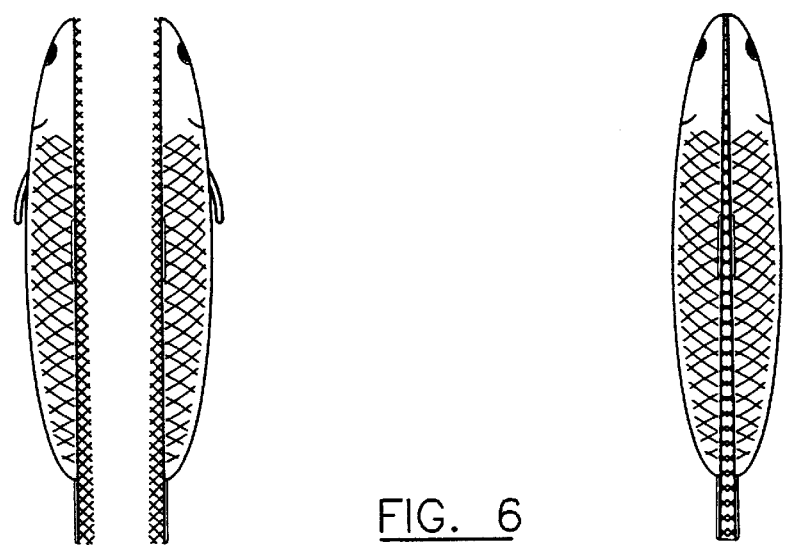
FIG. 6 shows method for joining two halves of casted lure together.

FIG. 6 shows that both halves 13 of the widened mold or model, having widened fins and tail sections, are then combined by conventional means, along their x-axis which results in a cast or mold 14 which has been widened in the z direction at the fins and tail section. This model may then be reproduced by standard casting or molding processes.

Figure 7:
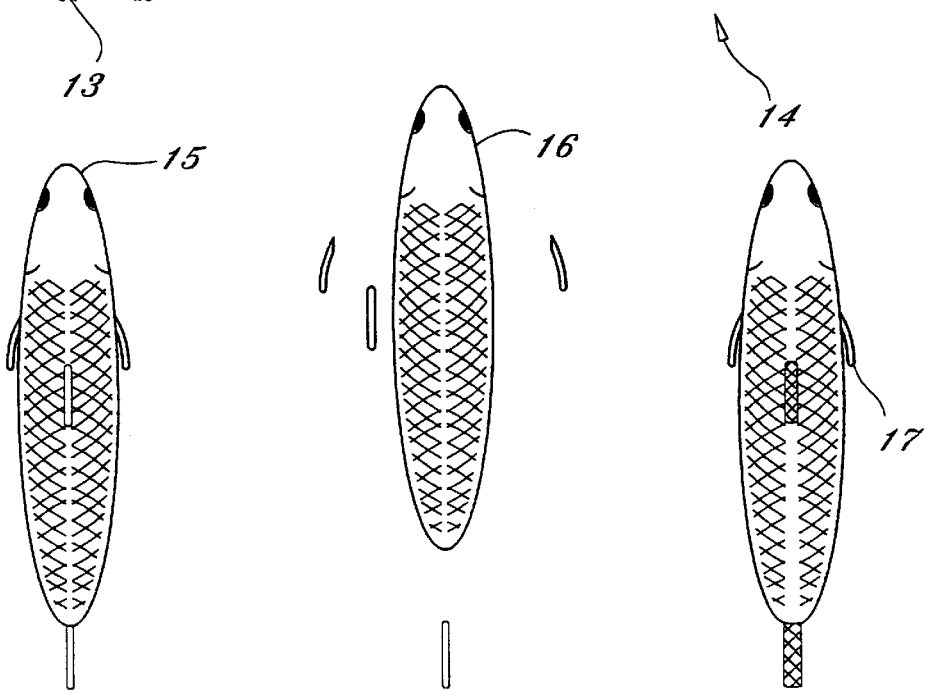
FIG. 7 shows method of removing fins from actual bait fish prior to casting and then cast them separately.

FIG. 7 shows an alternative widening embodiment where the baitfish 15 (or the duplicate cast of a baitfish) is used as a model from which the tail and fins are removed 16. The tail and fins then are subject to the same widening process as illustrated in FIGS. 1–5. The fins and tail section are then reattached to the model 16. Thus model 17 may then be reproduced by standard casting or molding processes. In this embodiment, the fins and tail section are still an actual reproduction of the actual profile of the natural bait's fins and tail section but are additionally widened for strength purposes and then reattached to the model.

Figure 8:
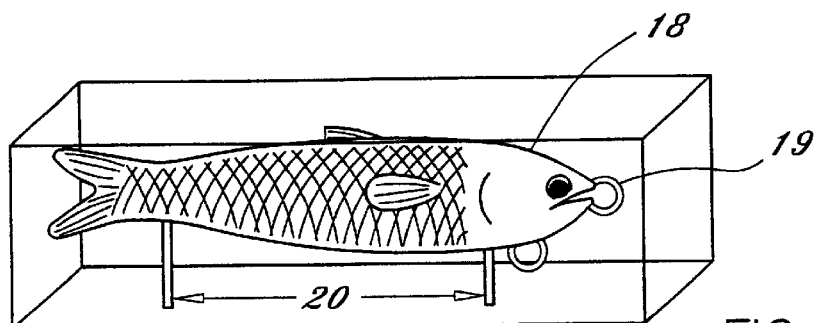
FIG. 8 shows a casting of lure bait fish with hook anchors in place.

FIG. 8 shows eyelets 19 for attachment of rings, hooks, or fishing line affixed to the specimen 18 being molded to later accommodate placement of these parts during production as before.

The rods 20 or mold gates which are conventional and are similar to previously described molding processes. The rods are used to affix the model, and hold the model in place, while the gates act as inlets for injecting or otherwise disposing castable material into the mold.

Figure 9:
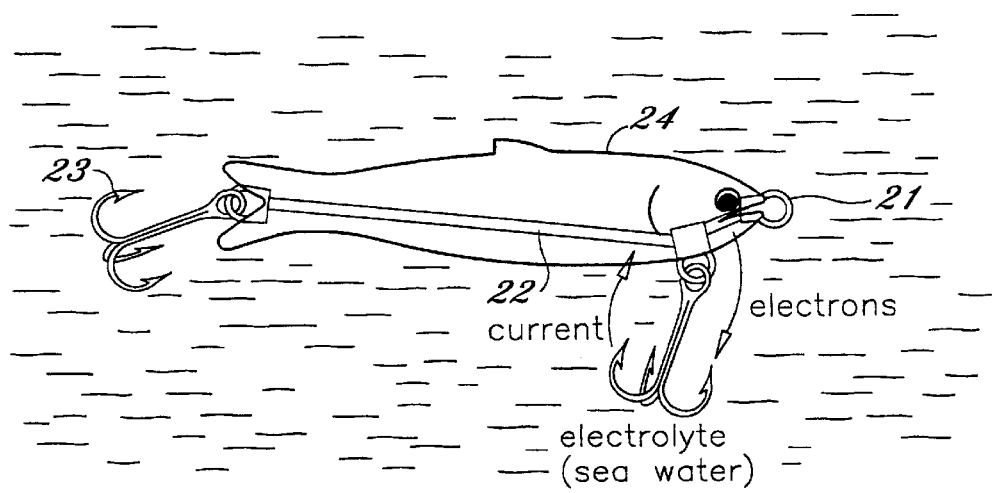
FIG. 9 shows use of dissimilar metal materials in lure which cause electrical current to flow from lure when placed in water.

FIG. 9 shows a fishing lure 24 exhibiting a design which would create a galvanic reaction in the water (electrolysis). Eyelets 21 embedded or inserted into the lure body would be mode from nickel, stainless steel, or another metal or alloy which should be more noble in the galvanic series than the metal used for the connecting wire or rod 22, such as zinc or magnesium, so that during electrolysis in the water electrons would be given up from the less noble metal used for the connecting rod of wire 22 to the more noble metals used for the hooks 23 and eyelets or other similar attachments 21. This will have the desired effect of protecting the hardware, that is the external attachments 21 and hooks 23, from the effects of corrosion (i.e., ruse and dulling of the hooks). The corrosion would in effect be transferred to the internal connecting rod or wire 22.

Figure 10:
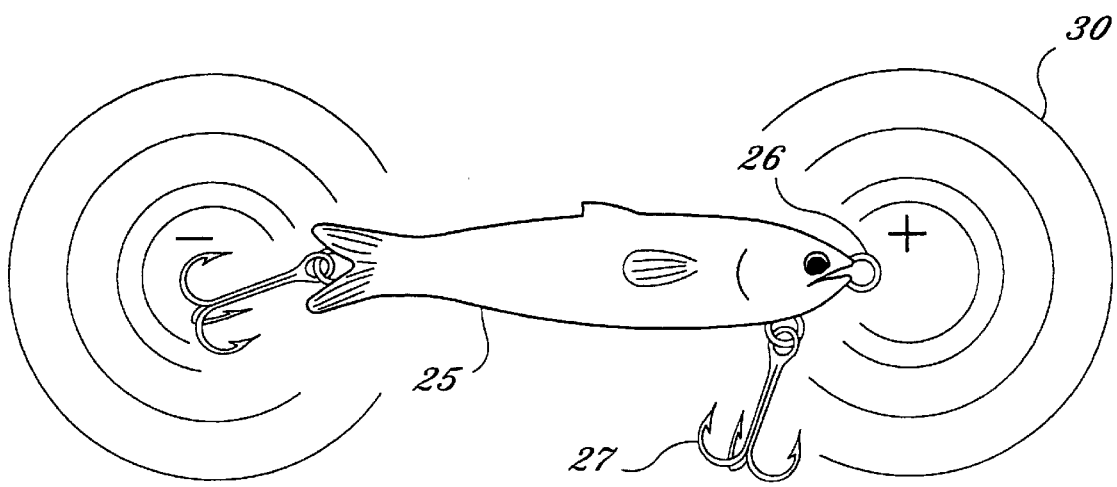
FIG. 10 shows the electromagnetic fields around the lure which will attract game fish.

FIG. 10 shows a lure 25 which is undergoing a galvanic reaction in seawater (an electrolyte). As the electrons pass through the seawater, they will generate an electromagnetic field 30. Many differently shaped electromagnetic field could be generated by different physical placements of the eyelets 26 and hooks 27. This particular field may be generated if the placement of the hooks and eyelets were such that the lure would be polarized with one end of the lure being more cathodic than the other end (the anode).

Figure 11:
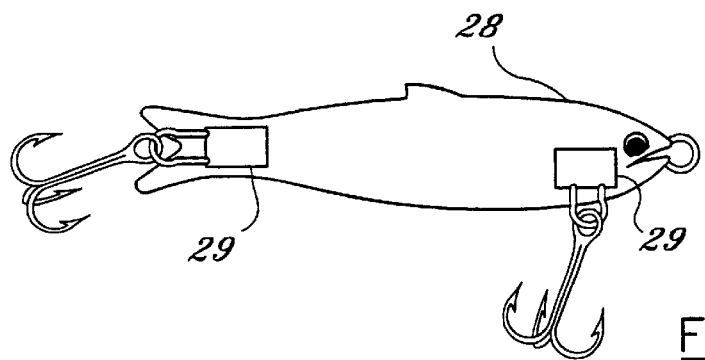
FIG. 11 shows an alternative method of using dissimilar metal materials in lure which cause electrical current to flow from lure when placed in water.

FIG. 11 shows a eyelet or "figure eights" as they are commonly referred to displayed on a fishing lure 28 that has not been wired through as in FIG. 9. A galvanic reaction is achieved by clamping or connecting a piece of metal 29 of much less nobility to the end of the eye-let which is embedded or inserted into the fishing lure.

Figure 12:
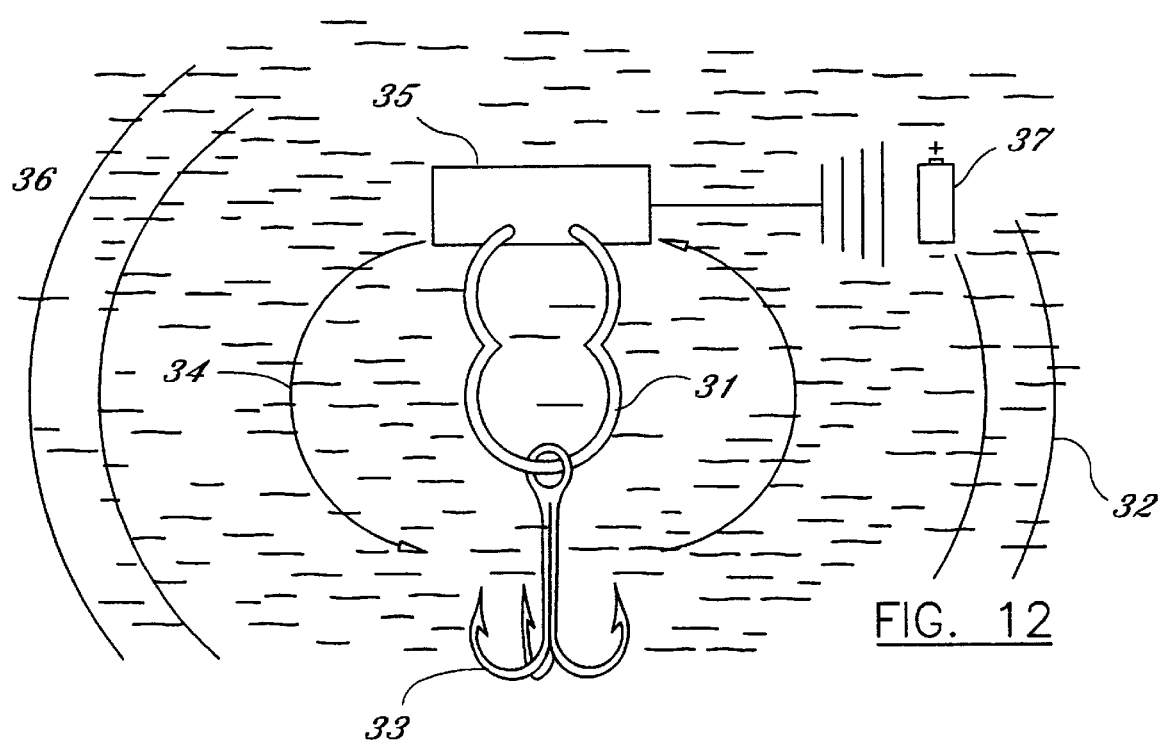
FIG. 12 shows the electric circuit and fields thereof which may also include a battery in the lure.
Figure 13:
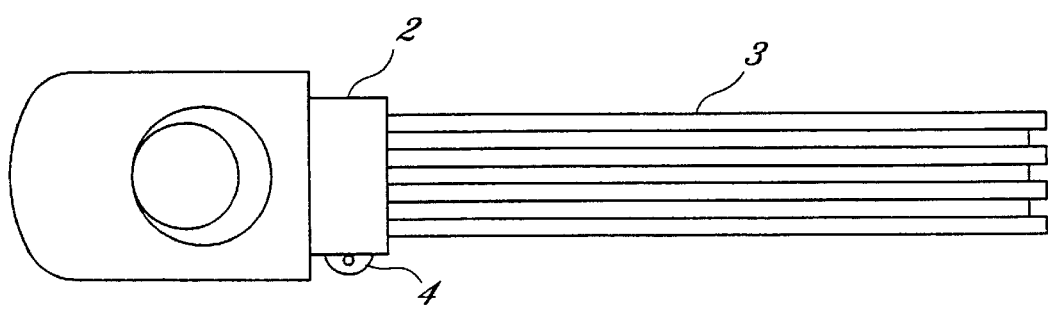
FIG. 13 shows a perspective view of a removable skirt sleeve device affixed to a trolling head style lure.
Figure 14:
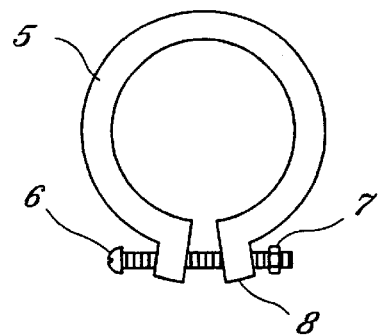
FIG. 14 is a plan view of the present invention shown in FIG. 13.
Figure 15:
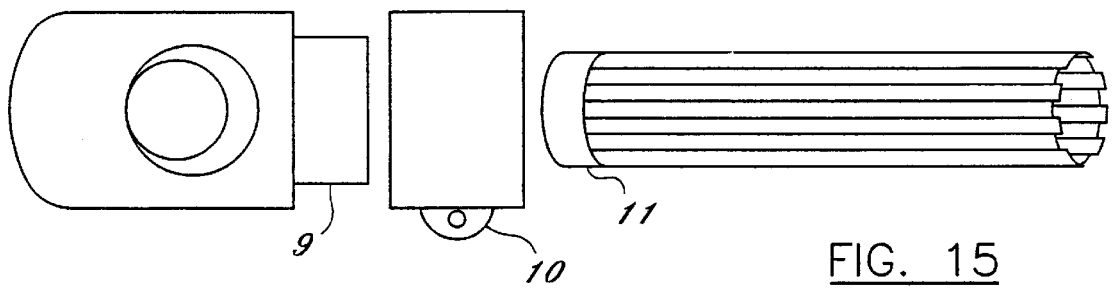
FIG. 15 is a sectional view of the present invention shown in FIG. 13.
Figure 16:
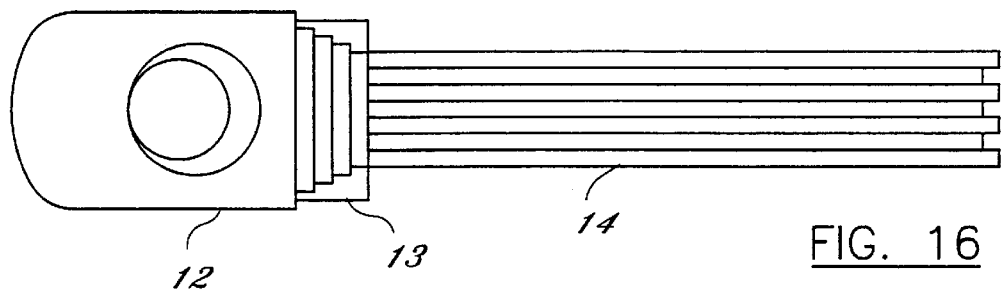
FIG. 16 is a perspective view of the present invention of FIG. 13 where compression is achieved by expanding and/or tapering the base of the head section of the trolling lure.
Figure 17:
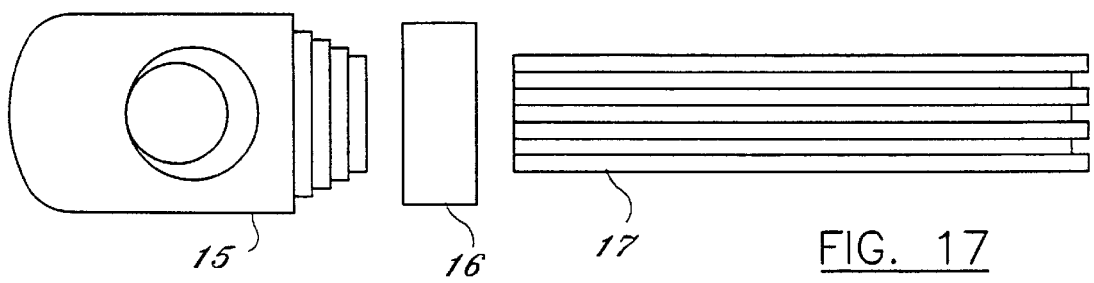
FIG. 17 is a sectional view of the present invention device of FIG. 16.
Figure 18:
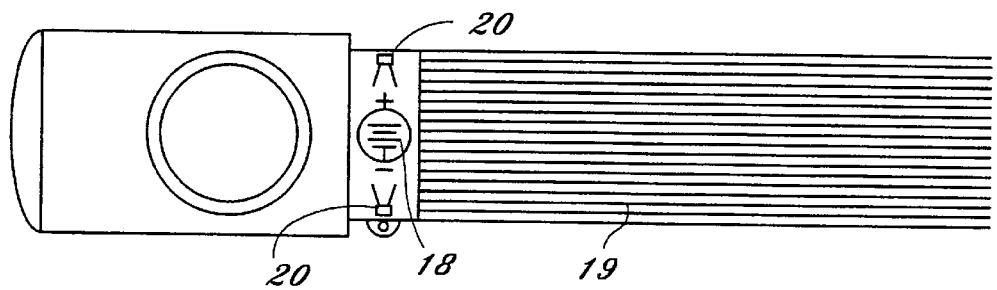
FIG. 18 is a perspective view of a removable skirt sleeve which has been fashioned to accommodate an electric battery for the purpose of illuminating fiber optic fibers incorporated into the skirt section of the trolling lure by means of an L.E.D. (light emitting diode) or any other light source.
Figure 19:
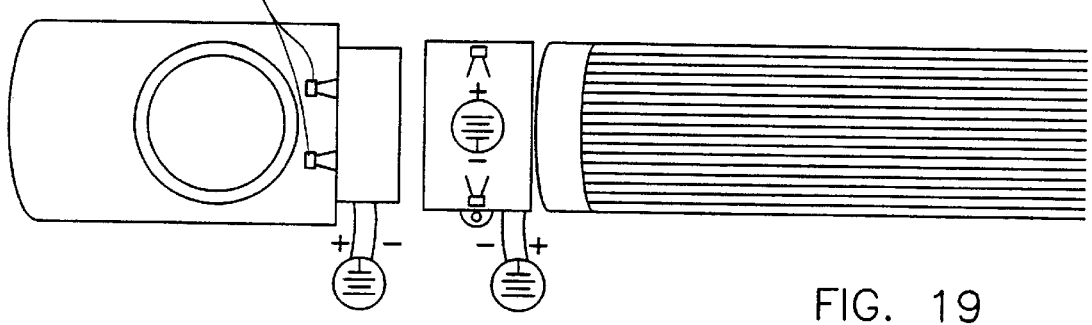
FIG. 19 is a sectional view of the present invention device of FIG. 18.
Figure 20:
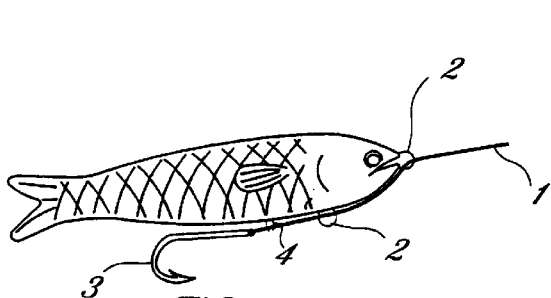
FIG. 20 is a side view of a "hook clip" for a through rigged fishing lure shown in its suspended position.

FIG. 12 shows a closeup view of the "figure eight" attachment 31 to the lure of FIG. 11 displaying the "Galvanic Battery" effect in seawater. Electrons pass through the seawater 32 then through the hook 33 and "figure eight" attachment 31. While this electrical current 34 is being produced, the metal of lesser nobility 35 gives up electrons to the hook 33 and "figure eight" attachment 31 which are made up of metals of a higher nobility causing the metal 35 to undergo corrosion while protecting the hook 33 and "figure eight" attachment 31 from corrosion. At the same time, an electromagnetic field 36 is created by the electrical current. This system is in effect itself a battery. A conventional battery 37 could feasibly be connected to the metal parts to increase the rate of the galvanic reaction and to create a greater electrical potential difference across the lure body. Accordingly, the present invention provides for a fishing lure comprising a body which has been cast in a method which has resulted in a widening of the fins and tail section of the baitfish while leaving the head and body sections of the fish in more or less their original dimensions.

Furthermore, the end result of a wider fins and tail section can be achieved by a different method which involves removing the fins and tail from either the original natural baitfish as in FIG. 1 or in the casts of FIG. 3. Excess material is then added to extend the fins and tail in the y direction. The widened fins and tail are then reattached to the model.

Additionally, the choice of metals or materials used for the eyelets or attachments (i.e., hooks, rings, etc.) are chosen to create a galvanic reaction for the purpose of:

1. protecting the exposed metal attachments, hooks, and rings of the fishing lure from the effects of galvanic corrosion, that is oxidation or rust; and 2. creating an electromagnetic field surrounding the lure that may be attractive to certain species of gamefish.

FIGS. 13 through 19 related to a removable skirt sleeve for trolling head style fishing lures. In this embodiment, the invention further relates to an accessory which secures the "skirt" to the trolling head on trolling head/skirt combination type fishing lures.

Trolling head/skirt combination style fishing lures have existed in varying shapes and forms for quite some time and have been manufactured from many different materials. In general the trolling head section of the fishing lure has been manufactured from materials such as wood, plastics, or resin to which is attached the skirt of the lure which is traditionally fashioned from strips of vinyl, rubber, cut leather or feathers. Standardly, the skirt section of the lure is attached to the trolling head section of the lure by means of adhesive, wire, string, dental floss, tape, thermowelding (heat fusing), and/or combinations thereof. The skirt is then by any of these commonly used manufacturing method firmly and permanently affixed or fused together.

The present invention offers a much greatly improved method of attaching the "skirt" section of the trolling sections of this trolling lure.

There are limitations to the currently available previously described trolling lures. the simple fact is they have accomplished what they had set out to do, firmly and permanently affixed the "skirt" of the trolling lure.

The fisherman then take his new fishing lure our trolling. Target game species of these skirted trolling head style lures are usually gillfish such as marlin, sailfish or swordfish or tuna fish, and trolling lures can usually be used time and time again. However if a more toothier fish such as a barracuda, wahoo, amberjack or heaven forbid a shark takes interest in the fisherman's trolling lure, more often than not after the ensuing battle between fisherman and fish, the fisherman may or may not have the fish, but often finds the "skirt" section of his once beautiful and typically expensive trolling lure shredded or altogether missing, with the exception of maybe a few strands of the skirt embedded in the glue and tape at the end of the head section of the trolling lure.

The present invention attaches the "skirt" section of the trolling lure to the head section of the trolling lure firmly in place but not permanently affixed or fused to the "head" section of the trolling lure. By the addition of a simple device or accessory which, for purposes of this discussion will be referred to as a "removable skirt sleeve", it is possible to quickly and easily reattach a new "skirt" to the "head" section of the trolling lure. By doing this the fisherman may then continue fishing in just a few minutes after an encounter with some toothy critter without costly trip to the local tackle shop, the trouble of self repairing, or the hassle of sending it back to the manufacturer for repairs. Also another added benefit of the present invention is that fish are attracted to different colors in different light or water conditions, or a different times of the day. With the present invention, the fisherman can change the color of his or her skirt until he or she finds which color works best, without having to invest a fortune to have all different color assortments of trolling lures. This provides a significant advantage over conventional trolling lures, since the head section of the trolling lure usually is quite the more expensive portion of the trolling head. The fisherman would need only keep an assortment of the less expensive skirts on hand.

A preferred embodiment made in accordance with the principles of the present invention utilizes a "removable skirt sleeve" to attach the "skirt" section trolling lure to the "head" section of the trolling lure. This sleeve or band encompasses the skirt section of the trolling lure to the base of the trolling lure by compressing the skirt section of the trolling lure around the base of the "head" section of the trolling lure. This will create a mechanical lock by means of the compression cause by the sleeve or band which surrounds the skirt and based of the head section of the trolling lure. The band or sleeve may be fashioned several different ways. The important part is that the sleeve be flexible or partially flexible with a means of clamping or tightening or then securing itself so as to compress the skirt to the head of the trolling lure. Alternatively the outside sleeve or band could be rigid or a continuous cylinder or band or clip and the base of the head section of the trolling lure could be tapered or designed to expand which would also cause compression of the skirt between the head an the clip, band or sleeve accessory.

FIGS. 20 through 23 concern through rigged fishing lures. A through rigged fishing lure is a fishing lure which has been designed so that the fishing line passes through the lure and is attached directly to the fish hook as opposed to the hooks being attached to the lure which is tied to the fishing line.

Through rigged fishing lures are commonly used for offshore big game sport fishing such as Marlin and other large gamefish. These lures are usually of the "squid" style which consist of "trolling head", a short cylindrical shaped piece of cast resin, plastic, wood, or a variety of other materials, which has a hole drilled through it in order for the fishing line to pass through it. The trolling head has a "skirt" (vinyl strips, feathers or a variety of other materials) attached or glued to the trolling head which trail behind the trolling head. This design works well for a squid shaped fishing lure.

However, when a through rigged design is used on a fish shaped fishing lure, there is the problem of the hook being free to rotate with the fishing line. Thus, a substantial risk is created that may prevent the hook from being in the optimum position to hook the fish. For example, the hook may be turned upside down with the barb of the hook (the part of the hook that hooks the fish) pointing away from a striking fish. To minimize this substantial risk, the present invention provides an improvement of the through rigged fishing lure which incorporates a "hook clip" which holds or suspends the hook itself in the desired optimal hook position but also allows for the hook to easily detach from the clip when a fish takes the hook.

The main objective of the "hook clip" is to allow the hook to clip onto the fishing lure body and then clip off the fishing lure body when the fish takes the hook. The hook clip could be made from metal, plastic, rubber or other conventional materials, or could be an extension of or incorporated into the fishing lure body.

Figure 21:
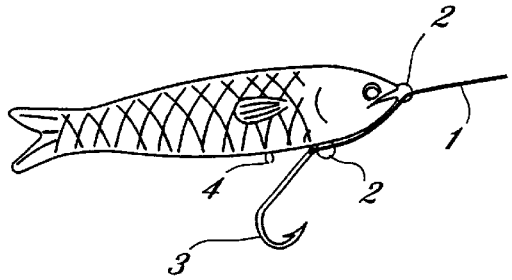
FIG. 21 is a side view of the "hook clip" of FIG. 20 shown in its detached suspended position.

In a first embodiment of the hook clip (FIGS. 20 and 21), the fishing line 1 passes through guide rings 2 and is attached directly to hook 3. A portion of the hook 3 is attached to hook clip 4 which suspends hook 3 with the barb pointing away from the lure in the affixed position. Hook clip 4 and guide rings 2 are attached to the lure by any conventional means, all are considered within the scope of the invention. FIG. 21 demonstrates the hook 3 in the detached from hook clip 4 position.

Figure 22:
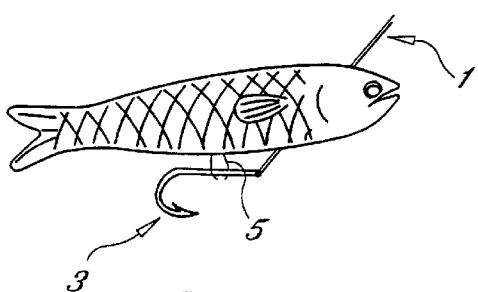
FIG. 22 is a side view of an alternative "hook clip" for a through rigged fishing lure shown in its suspended position.
Figure 23:
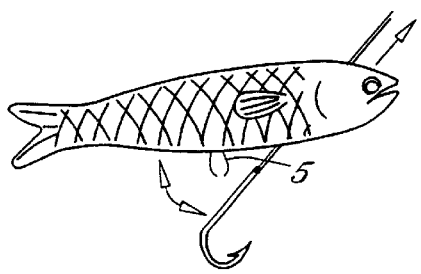
FIG. 23 is a side view of the "hook clip" of FIG. 22 shown in its detached suspended position.

FIGS. 22 and 23, illustrate an alternative drilled-through design. In this alternative embodiment, fishing line 1 passes through hole in the lure body. The "hook clip" 5 holds hook 3 in affixed position with hook facing away from lure body. FIG. 23 shows hook 3 in its detached position.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A fishing lure, comprising a body member and means for maintaining a hook having a barbed portion pointing away from said body member in an affixed position with respect to said body member.

2. The fishing lure of claim, 1 wherein said means for maintaining is attached to said body member.

3. The fishing lure of claim 1 wherein said means for maintaining is a clip adapted to maintain the hook in the affixed position.

4. The fishing lure of claim 1, wherein said means for maintaining disposed at a bottom surface of said body member.

5. The fishing lure of claim 1, wherein said hook includes a barb portion and said desired position is the barb portion pointing away from the body member.

6. The fishing lure of claim 1 further including at least one guide ring attached to said body member.

7. A fishing lure, comprising a body member and means for maintaining a hook in a desired position with respect to said body member; wherein said means for maintaining is a clip; wherein said clip defining a hook receiving area and having a slot in communication with said receiving area.

8. The fishing lure of claim 7 wherein said slot is slightly smaller in size than a diameter of said hook to allow a portion of said hook to be inserted through said slot, while maintaining the portion of said hook within the receiving area and in the desired position until released by a sufficient force.

9. The fishing lure of claim 8 wherein said sufficient force is caused when a fish at least partially swallows the hook and begins to swim away.

10. A fishing lure, comprising a body member and a clip attached to said body member, said clip adapted to maintain a hook in an affixed position with respect to said body member, said clip defining a hook receiving area and having a slot in communication with said receiving area.

11. The fishing lure of claim 10 wherein said slot is slightly smaller in size than a diameter of said hook to allow a portion of said hook to be inserted through said slot, while maintaining said hook within the receiving area until released by a sufficient force.

12. The fishing lure of claim 11 wherein said sufficient force is caused when a fish at least partially swallows the hook and begins to swim away.

* * * * *